(12) United States Patent
Wangercyn, Jr. et al.

(10) Patent No.: US 8,950,638 B2
(45) Date of Patent: Feb. 10, 2015

(54) FINGER LOOP FOR PORTABLE ELECTRONIC DEVICE CASE

(71) Applicants: George J. Wangercyn, Jr., Schererville, IN (US); John T. Wangercyn, Schererville, IN (US); James R. Wangercyn, Schererville, IN (US)

(72) Inventors: George J. Wangercyn, Jr., Schererville, IN (US); John T. Wangercyn, Schererville, IN (US); James R. Wangercyn, Schererville, IN (US)

(73) Assignee: Loopy Cases LLC, Schererville, TN (US)

( * ) Notice: Subject to any disclaimer, the term of this patent is extended or adjusted under 35 U.S.C. 154(b) by 0 days.

(21) Appl. No.: 14/037,287

(22) Filed: Sep. 25, 2013

(65) Prior Publication Data

US 2014/0084034 A1    Mar. 27, 2014

Related U.S. Application Data

(60) Provisional application No. 61/705,378, filed on Sep. 25, 2012.

(51) Int. Cl.
*A45F 5/00* (2006.01)
*A45C 11/00* (2006.01)

(52) U.S. Cl.
CPC . *A45C 11/00* (2013.01); *A45F 5/00* (2013.01); *H04B 1/385* (2013.01); *A45C 2011/002* (2013.01); *A45F 2005/008* (2013.01); *A45F 2200/0516* (2013.01); *H04B 2001/3861* (2013.01); *Y10S 224/93* (2013.01)
USPC ......................................... 224/217; 224/930

(58) Field of Classification Search
USPC ............. 224/217, 578, 930; 294/25; 150/107, 150/108
See application file for complete search history.

(56) References Cited

U.S. PATENT DOCUMENTS

| | | | | |
|---|---|---|---|---|
| 471,854 | A * | 3/1892 | Gareis | 224/217 |
| 550,302 | A * | 11/1895 | Thompson | 224/217 |
| 3,488,126 | A * | 1/1970 | Avallone | 401/8 |
| 3,540,160 | A * | 11/1970 | De Rose et al. | 451/344 |
| 5,027,874 | A * | 7/1991 | Gazzola | 150/108 |
| D381,129 | S * | 7/1997 | Lawrence | D29/115 |
| 7,311,591 | B2 * | 12/2007 | Stubbs | 451/538 |
| 7,708,141 | B1 * | 5/2010 | Huang | 206/425 |
| 7,899,853 | B1 * | 3/2011 | Fakharzadeh | 708/131 |
| D647,085 | S * | 10/2011 | Chung et al. | D14/250 |
| 8,374,657 | B2 * | 2/2013 | Interdonato | 455/575.4 |
| 8,428,664 | B1 * | 4/2013 | Wyers | 455/575.1 |
| 8,479,990 | B2 * | 7/2013 | Chiarini | 235/439 |
| 8,480,144 | B2 * | 7/2013 | Potter et al. | 294/25 |
| 8,528,798 | B2 * | 9/2013 | Chen | 224/217 |
| 8,550,317 | B2 * | 10/2013 | Hyseni | 224/197 |
| 8,567,832 | B2 * | 10/2013 | Kannaka | 294/25 |
| 2009/0090750 | A1 * | 4/2009 | Alcenat | 224/101 |
| 2009/0270050 | A1 * | 10/2009 | Brown | 455/90.3 |
| 2011/0266316 | A1 * | 11/2011 | Ghalib et al. | 224/217 |
| 2011/0309117 | A1 * | 12/2011 | Roberts | 224/217 |

(Continued)

*Primary Examiner* — Justin Larson
(74) *Attorney, Agent, or Firm* — Wood, Phillips, Katz, Clark & Mortimer

(57) ABSTRACT

The invention disclosed herein is a finger loop for use with a portable electronic device case, housing or enclosure. The finger loop is formed by a strip of material such as silicone or rubber that extends away from the rear outer surface of the case, housing, or enclosure, and returns to the rear outer surface of the case, housing, or enclosure thereby forming a loop through which a user can insert at least one, or a plurality of fingers to aid in holding the device. The strip of material may include features to increase friction with the inside surface of the case or with the portable electronic device itself.

17 Claims, 17 Drawing Sheets

(56) References Cited

U.S. PATENT DOCUMENTS

| | | | |
|---|---|---|---|
| 2012/0031937 A1* | 2/2012 | Baker | 224/217 |
| 2012/0299318 A1* | 11/2012 | Murphy et al. | 294/25 |
| 2013/0119099 A1* | 5/2013 | Interdonato | 224/217 |
| 2013/0146625 A1* | 6/2013 | Karle et al. | 224/217 |

* cited by examiner

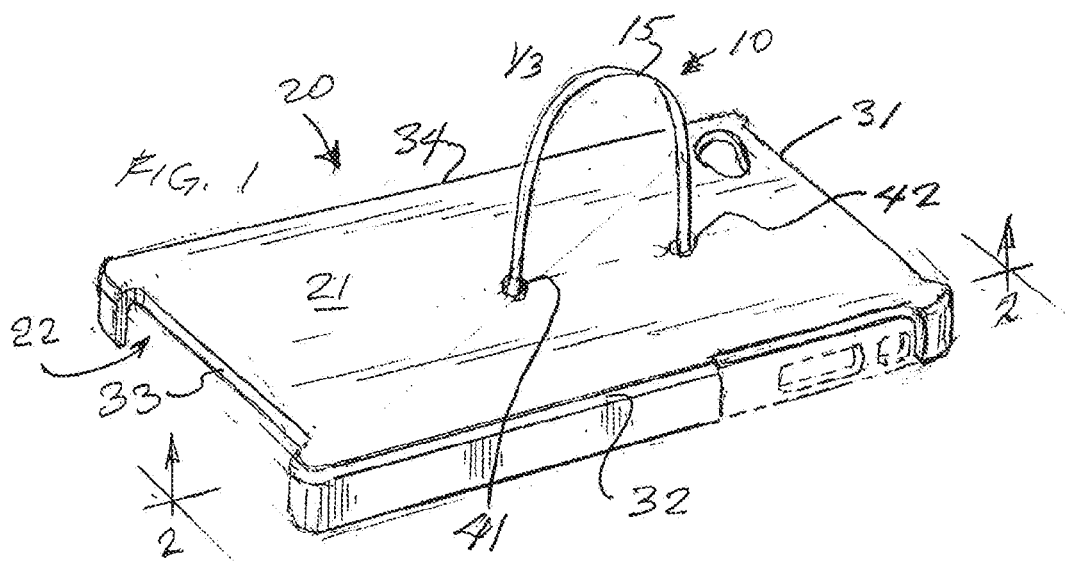
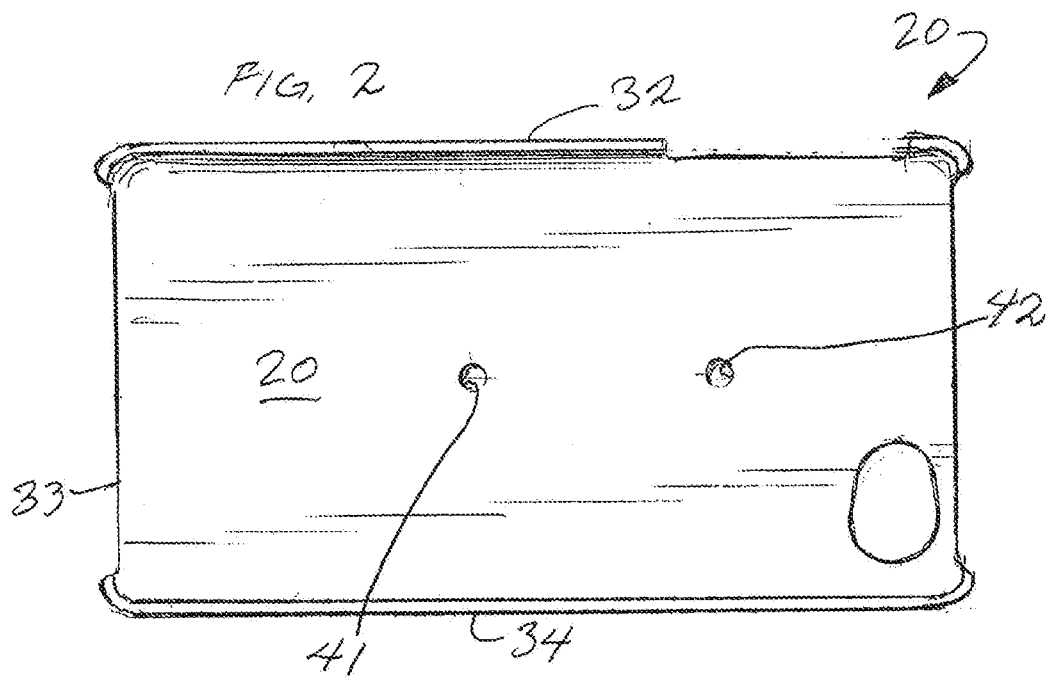
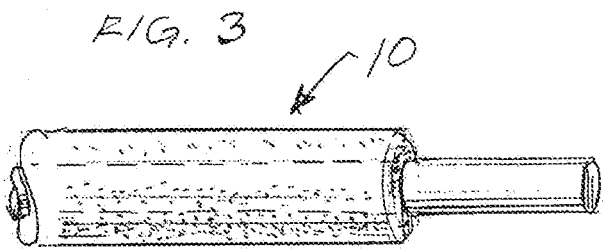
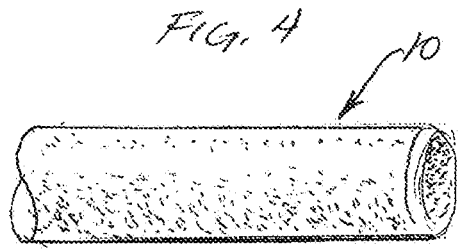

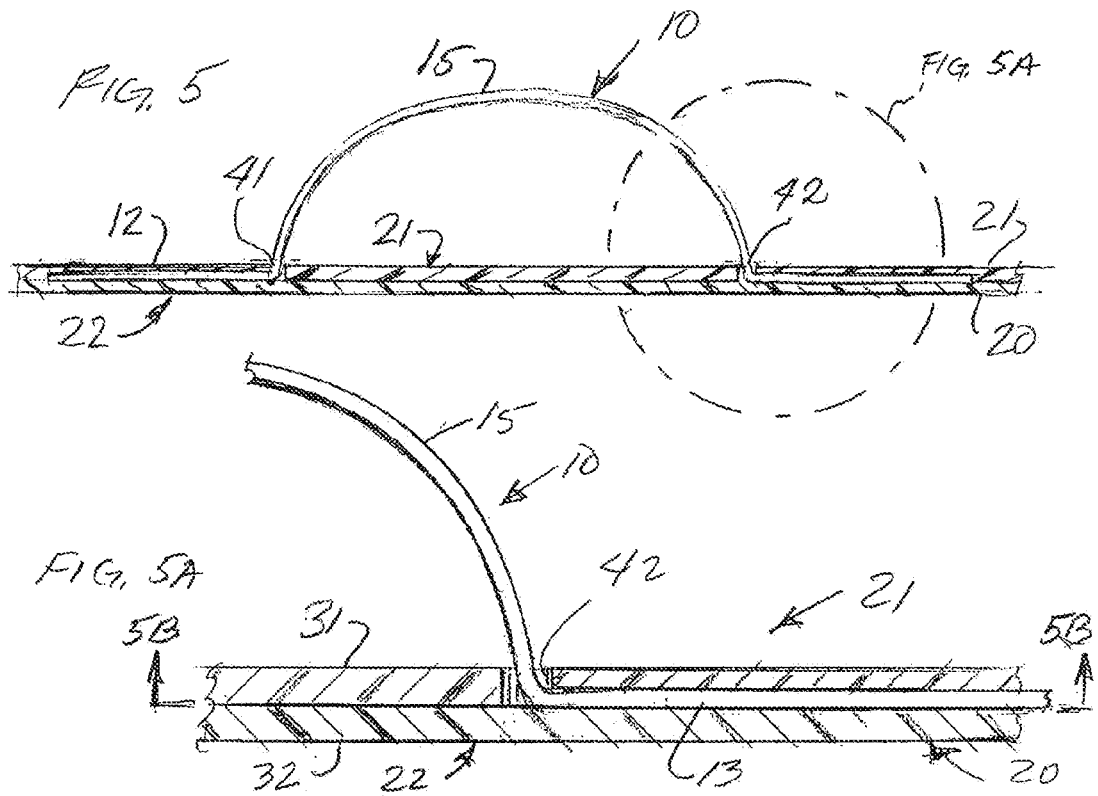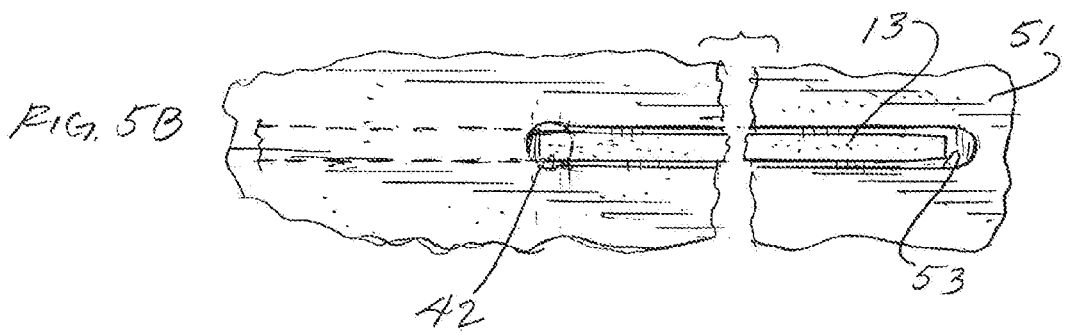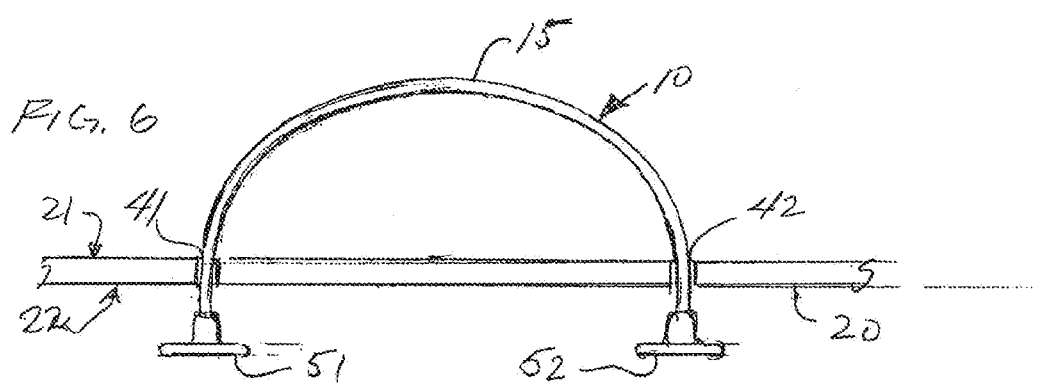

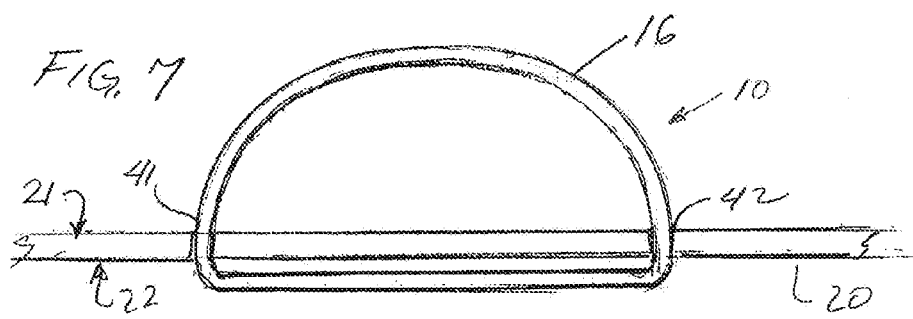
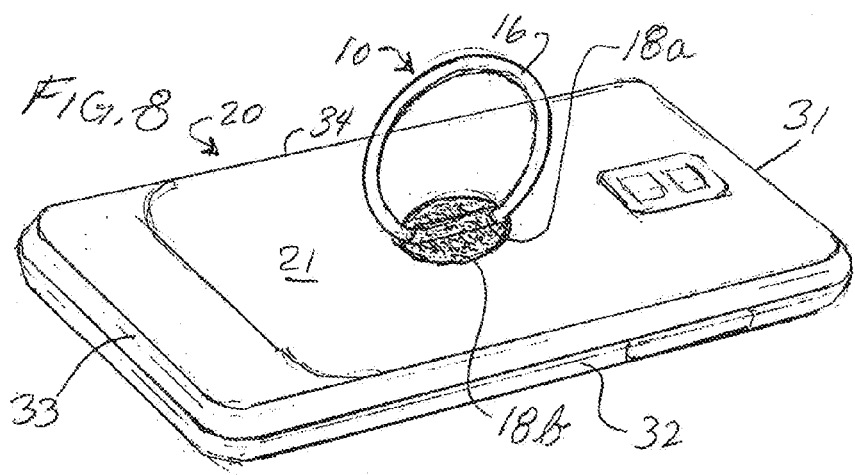
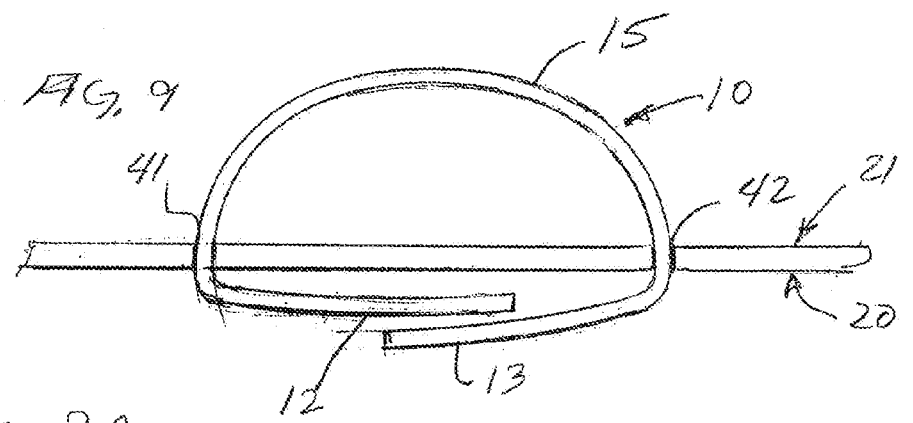
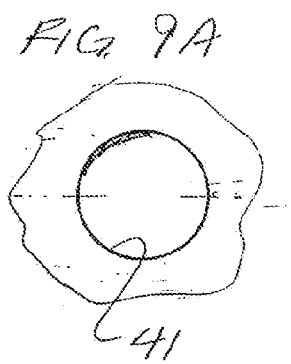
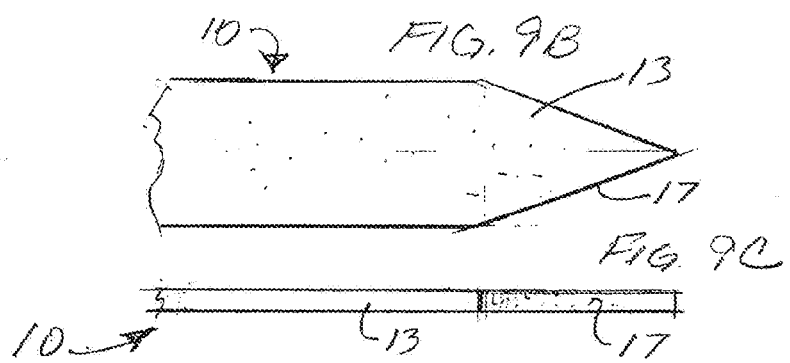

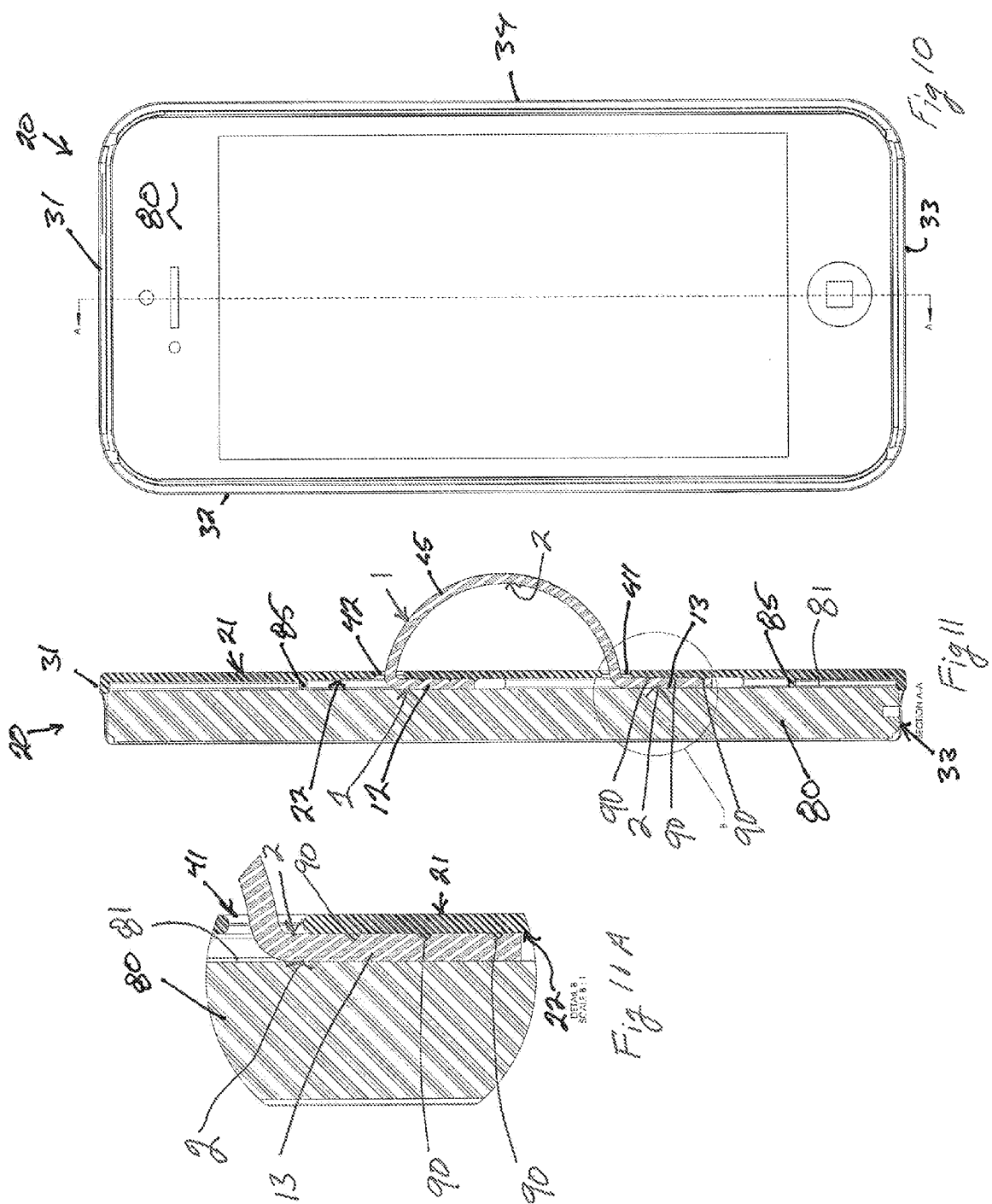

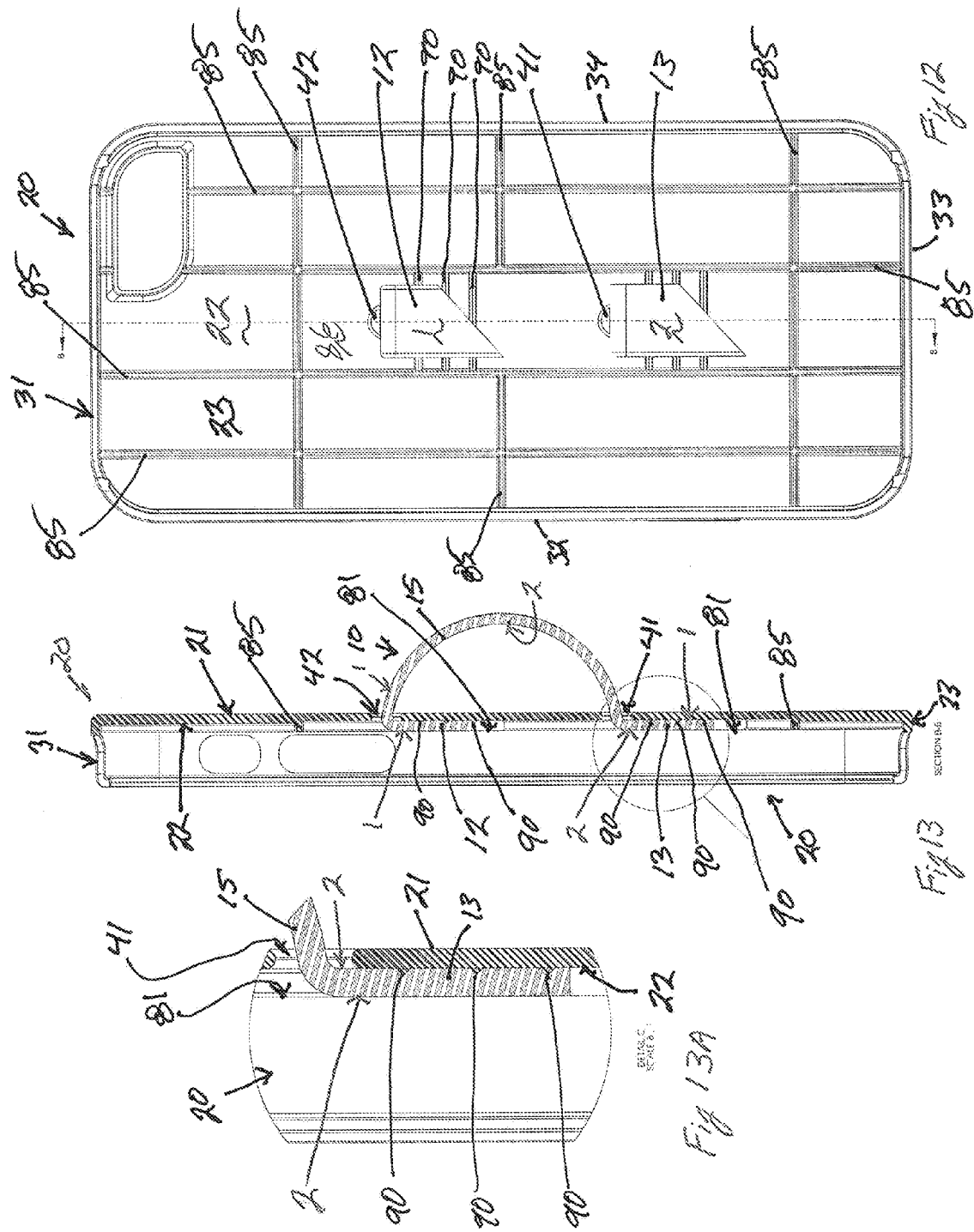

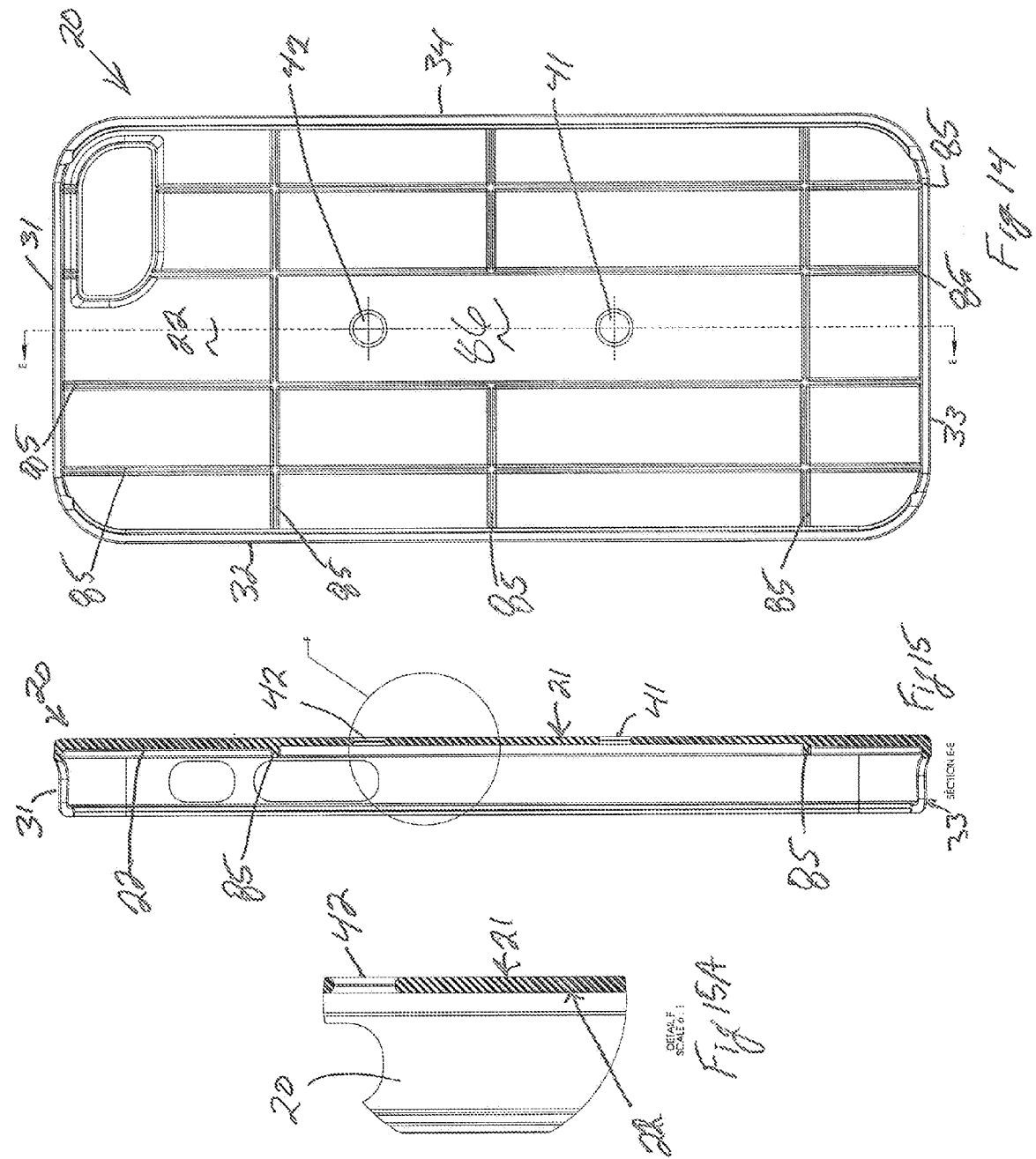

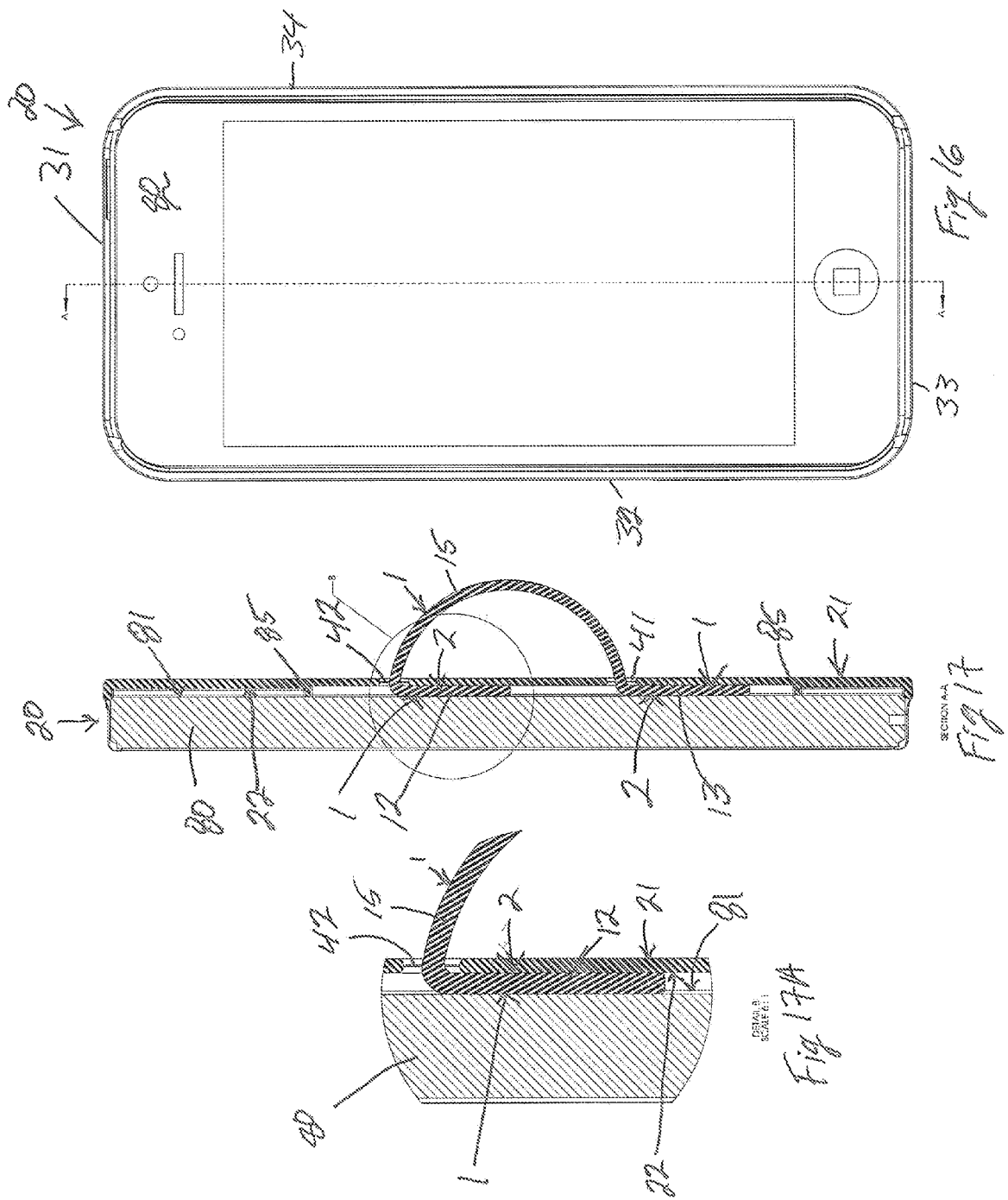

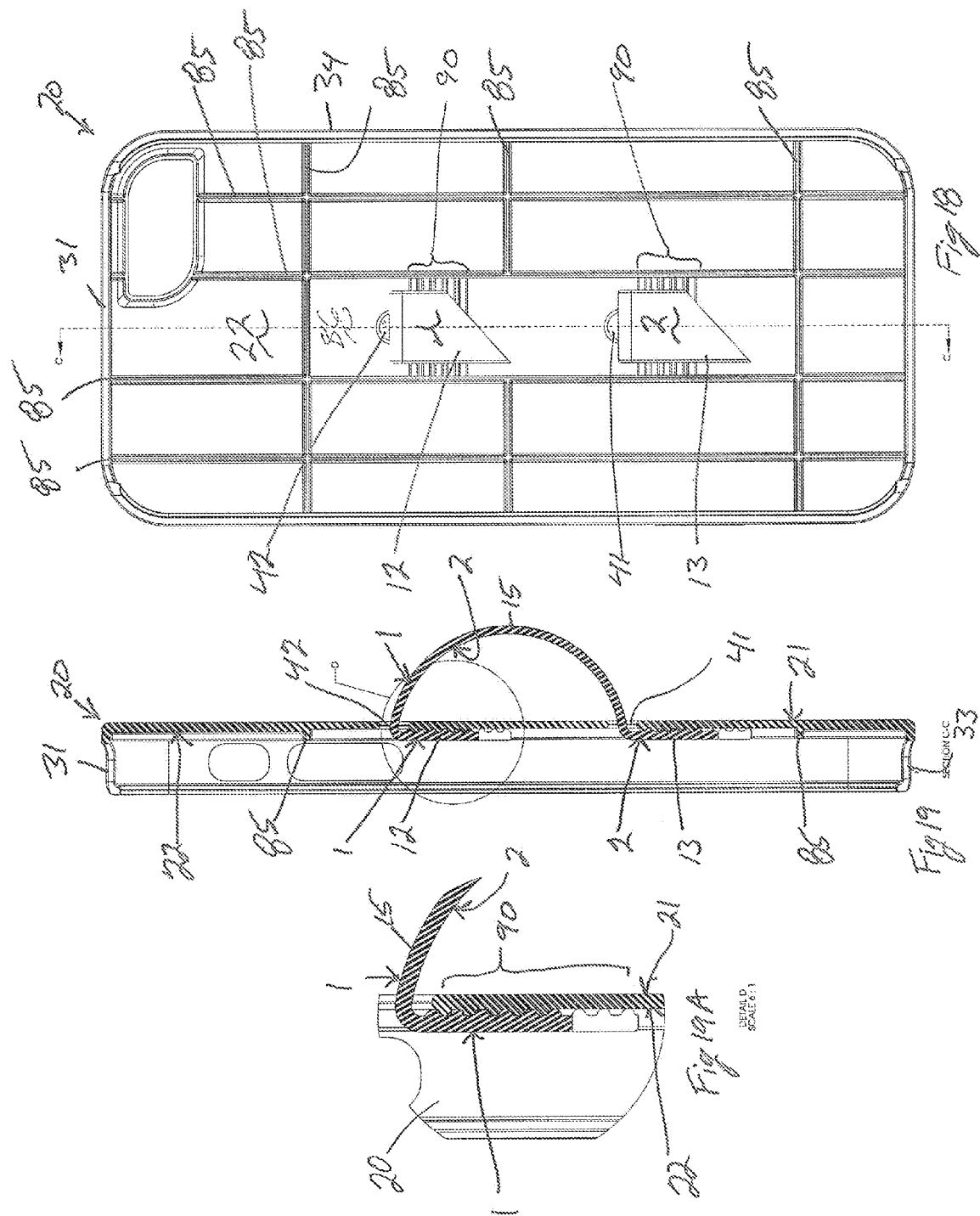

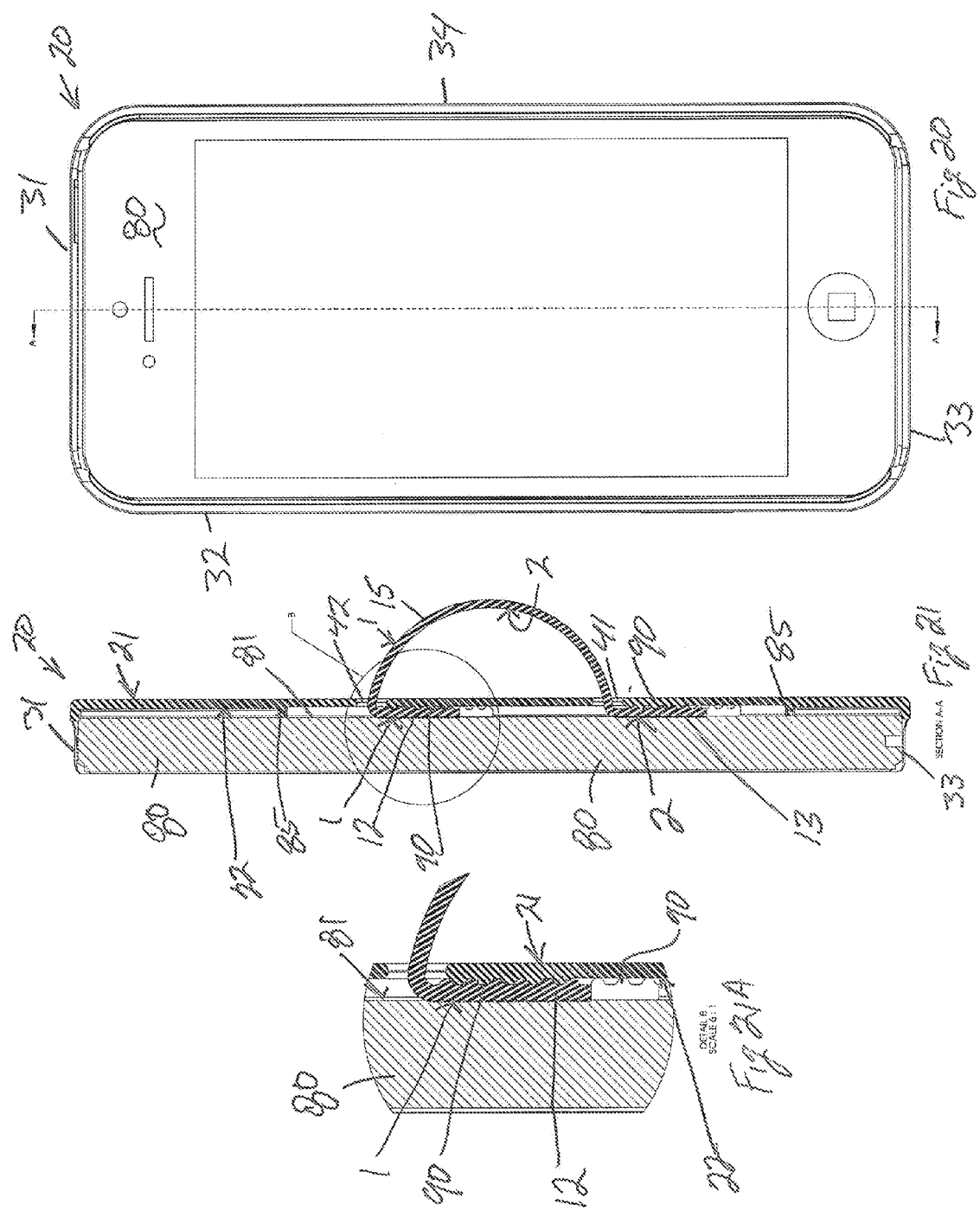

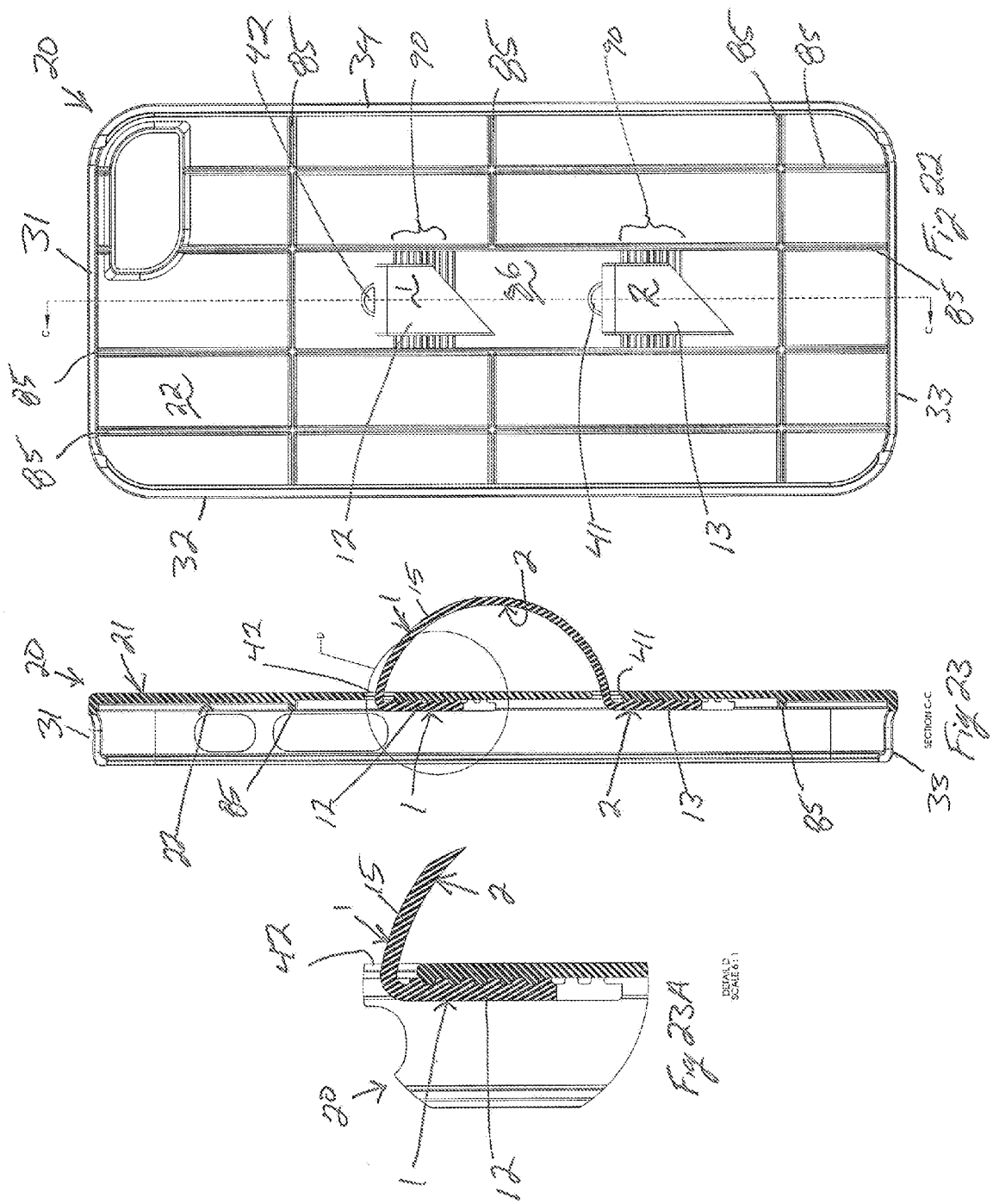

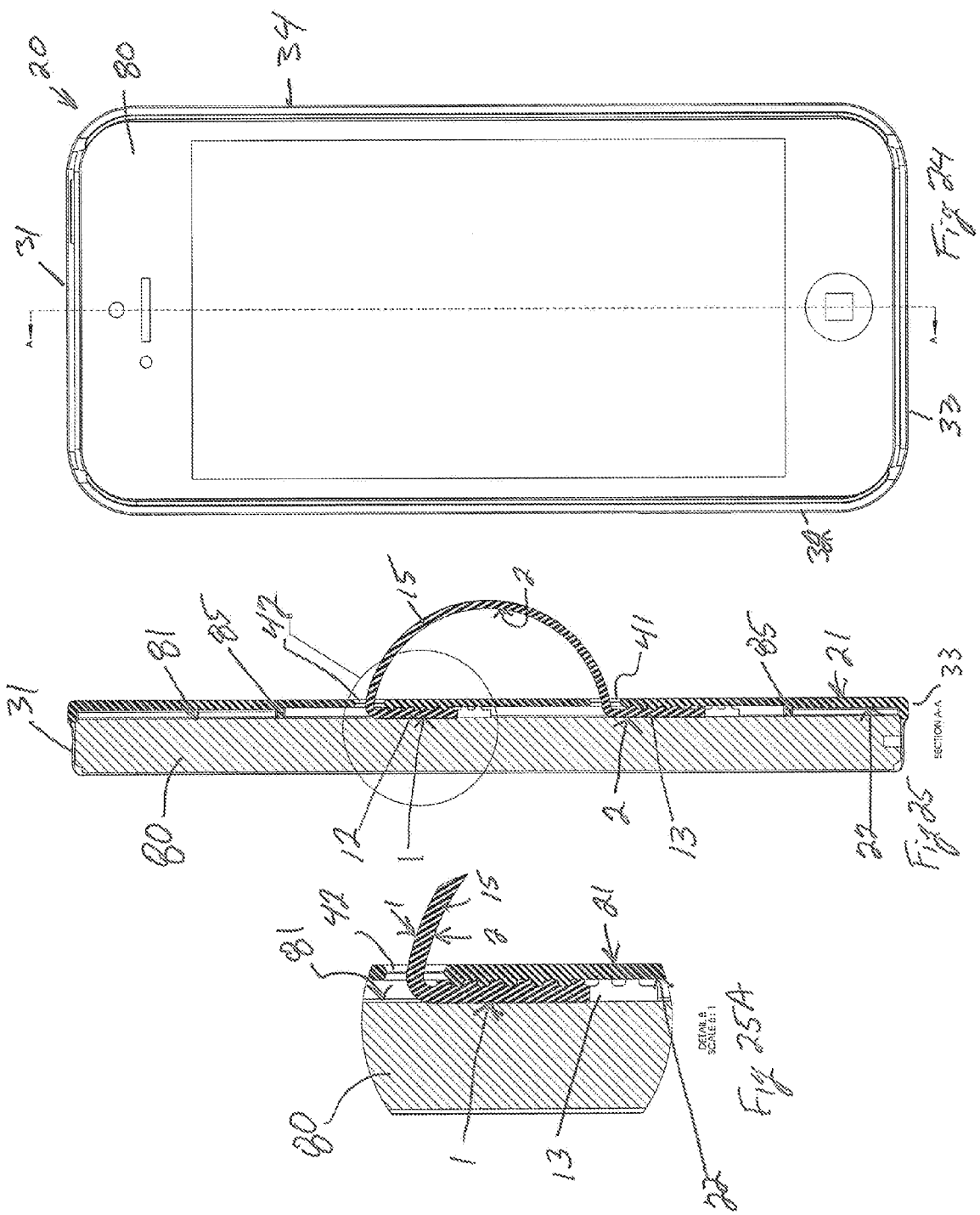

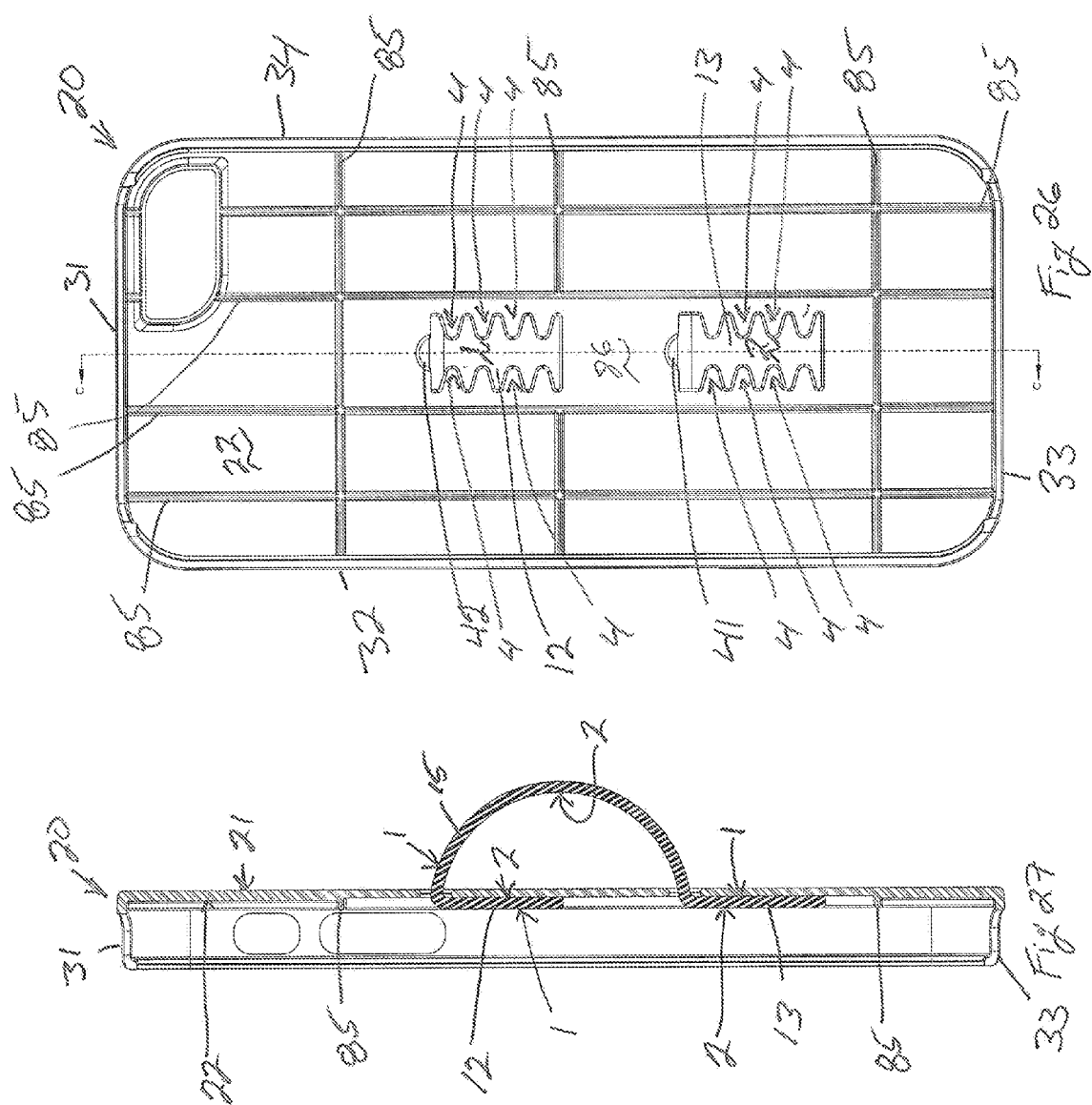

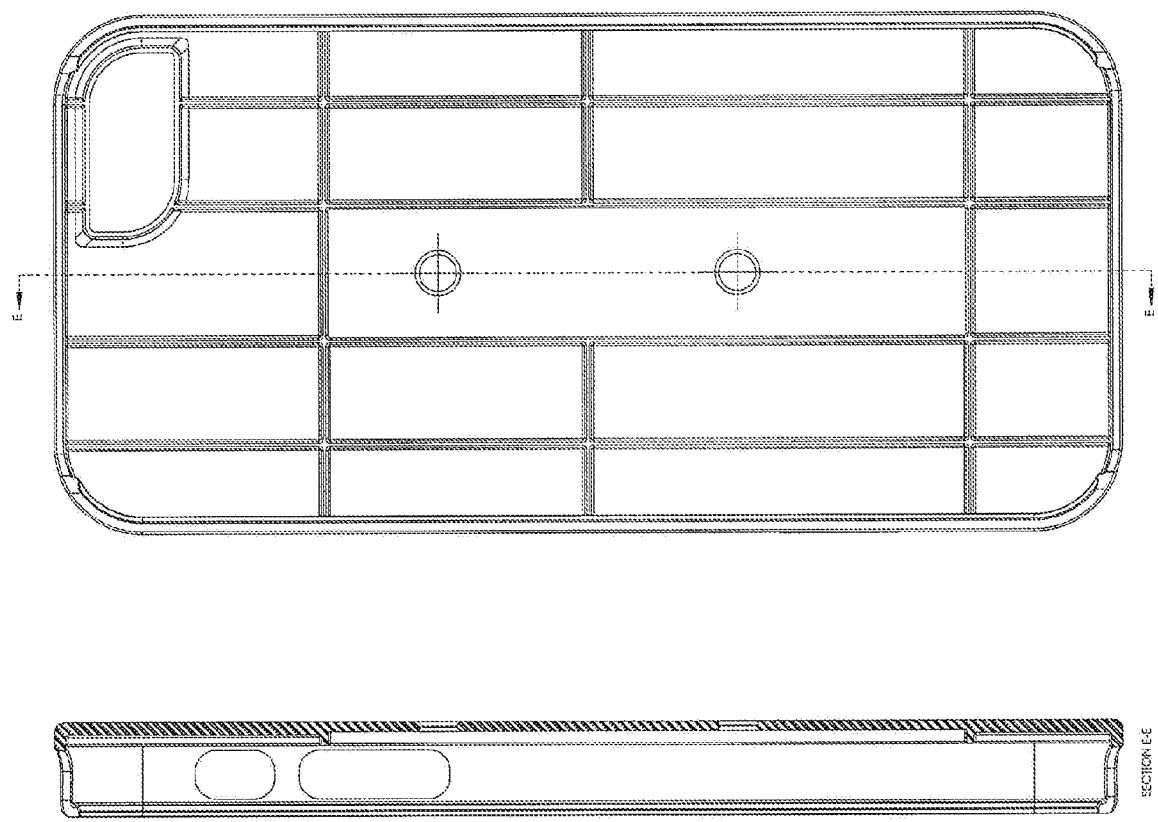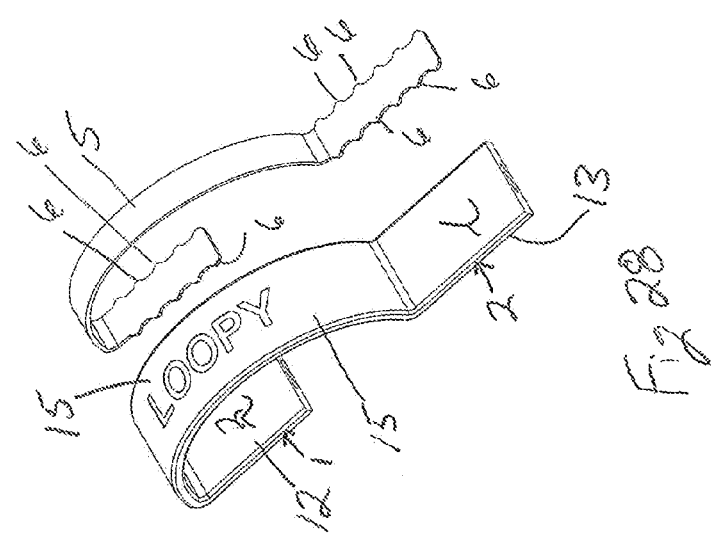

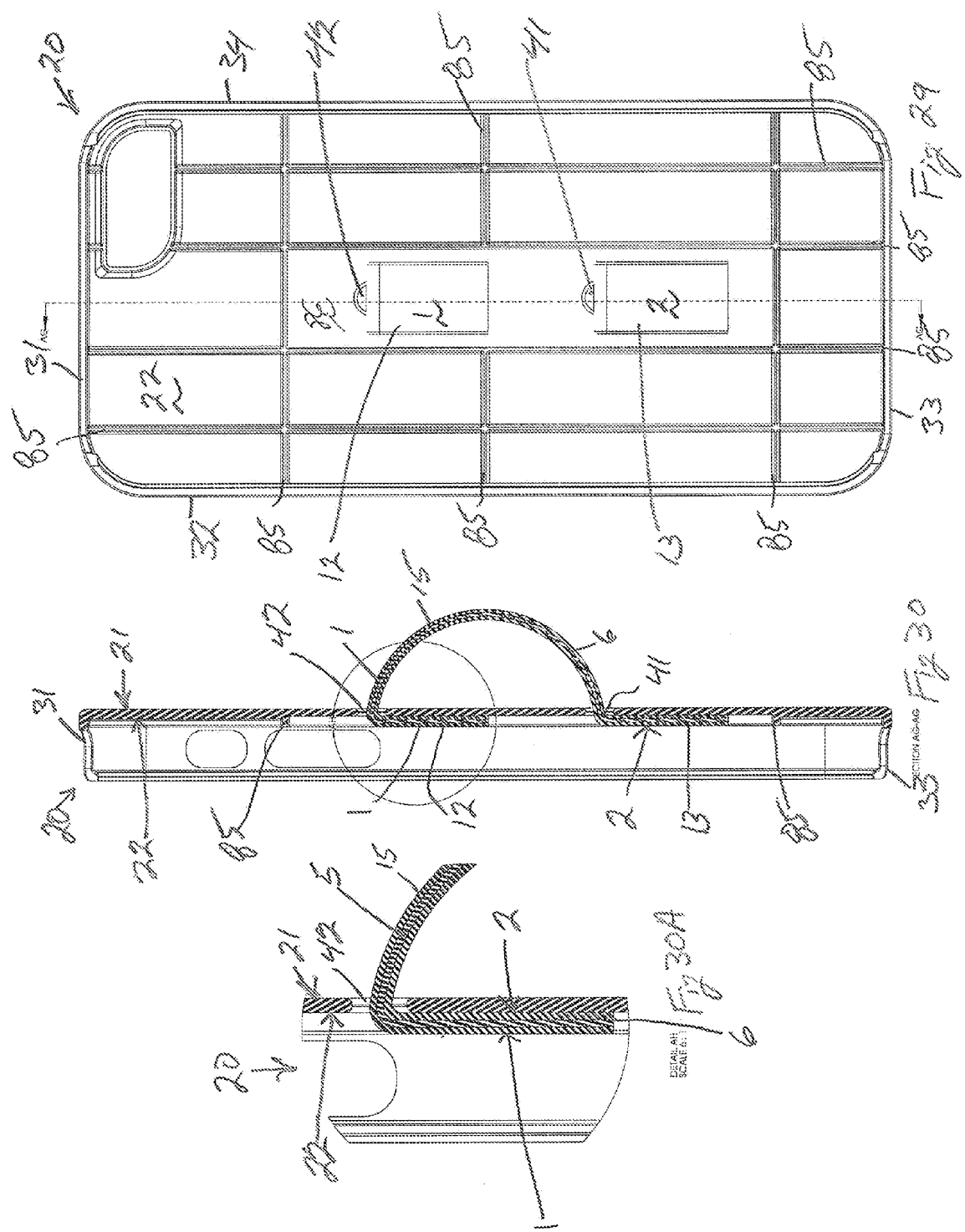

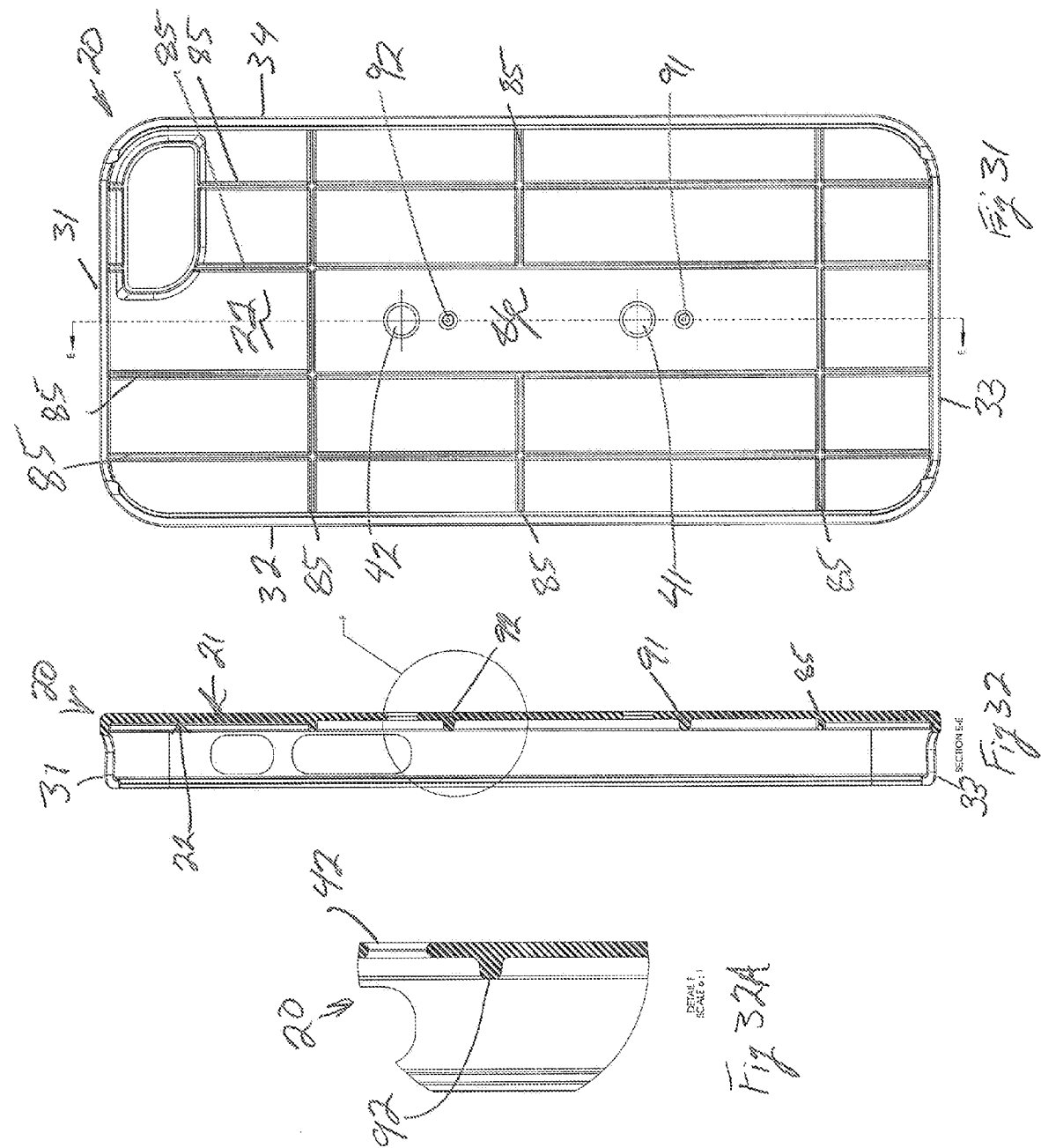

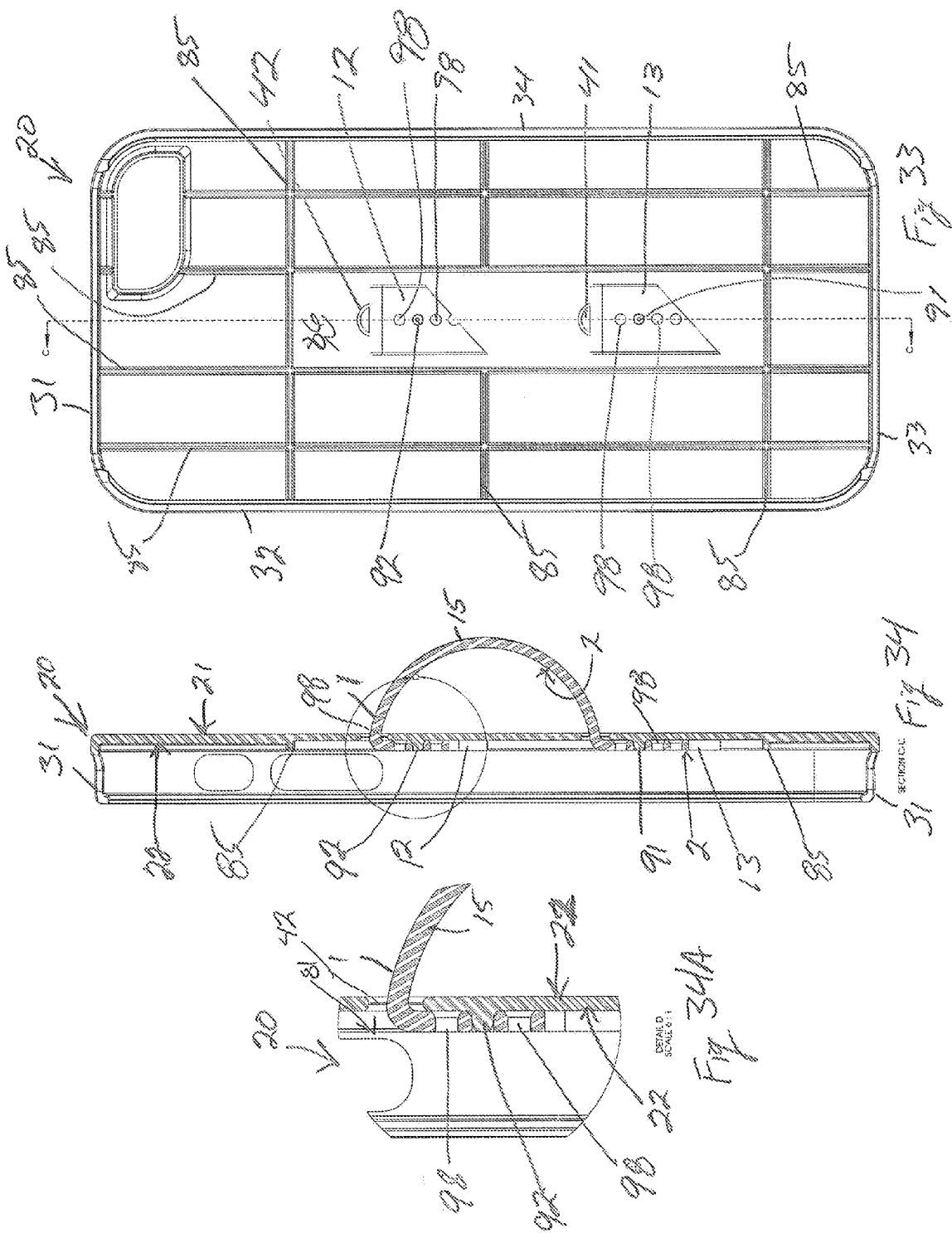

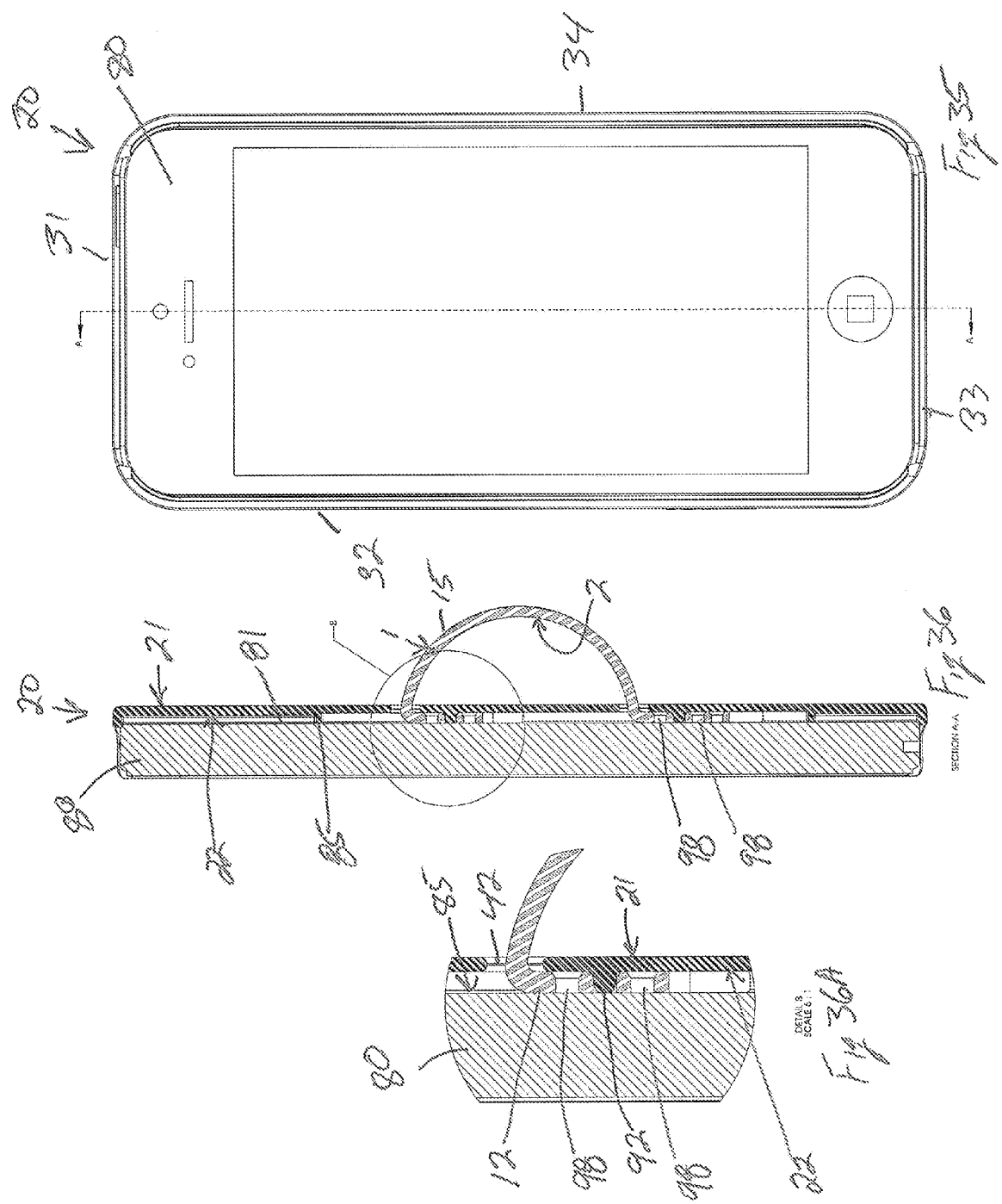

FINGER LOOP FOR PORTABLE ELECTRONIC DEVICE CASE

RELATED APPLICATIONS

This application claims priority to U.S. provisional application 61/705,378, filed on Sep. 25, 2012.

BACKGROUND OF THE INVENTION

Portable electronic devices such as cell phones have become wider, thinner, and lighter than in the past. The thin rectangular shape results in the user often only grasping the thin circumfral edge of the device with the fingers and thumb of one hand. If one is holding the device in one hand and uses their thumb to activate the touch screen of the device, one may have little grip on the device at all, as one's fingers are not on the edge of the device, but are instead on the back of the device with the device resting on the users fingers and palm. This makes the device susceptible to being dropped, and broken or damaged in a fall to the ground.

Thus, there is a need for an improved case, housing, or enclosure for portable electronic devices, particularly those with a touch screen that allows for an improved grip or retention of the device. Specifically, the invention herein includes a finger loop affixed to the back of the case, housing, or enclosure, the finger loop allowing a user to place at least one of his fingers through the loop to aid in the retention of the device.

FIELD OF THE INVENTION

The field of the invention is cases, enclosures, and housings for portable devices that are held in the hand of a user of the device.

SUMMARY OF THE INVENTION

The invention may be used with a case, housing, or enclosure of a portable electronic device. By housing or enclosure, the applicant means the outer shell provided by the manufacturer that houses the electronics of the device and forms the outer surfaces of the device. For instance, the Apple iPhone 4s includes two pieces of glass and a metal band about the perimeter of the phone as part of the housing or enclosure. By the word case, the applicant means a removable cover that fits over part of the housing or enclosure. An example of a case would be a Candy Shell case made by Speck.

Whether applied to a housing, enclosure or case, the invention includes a strip of material, such as a wire or silicone gasket type material, that forms a loop on the back of the case, housing or enclosure. The loop is positioned in relation to the case, housing, or enclosure so that the user can fit at least one, or possibly more, fingers into the loop when the user holds the case, housing or enclosure with one hand. The loop may be a continuous loop with part of the loop affixed to the case, housing or enclosure, or it may be a length or strip of material that extends from the outer surface of the case housing or enclosure, and then returns back to the case, housing, or enclosure, forming a loop that extends from the surface of the case, housing, or enclosure.

BRIEF DESCRIPTION OF THE DRAWINGS

FIG. 1 is a perspective view of a cell phone case or cover with a finger loop.

FIG. 2 is a plan view of the inside of a cell phone case or cover with two apertures for accepting the loop of material.

FIG. 3 is a detailed view of an example of a coated wire used for the loop of material.

FIG. 4 is a detailed view of an example of a solid flexible material such as silicone or rubber used for the loop of material.

FIG. 5 is a cross sectional view of a case or cover with a loop of material, the loop ends molded into the case.

FIG. 5a is a detailed view of a portion of FIG. 6.

FIG. 5b is a detailed view of an end of the loop molded into the case.

FIG. 6 is a cross sectional view of a portion of a cell phone case, housing, or enclosure, showing the loop of material in two apertures, the loop including anchors at the ends.

FIG. 7 is a cross sectional view of a case or cover with a continuous loop of material forming the loop.

FIG. 8 is a perspective view of a case or housing with a continuous loop of material forming the finger loop, the finger loop held on with hook and loop fasteners FIG. 9 is a cross sectional view of an embodiment of the invention showing a thicker loop of material that may be adjusted to allow the size of the loop to be adjusted.

FIG. 9a shows an example of the relative size of the aperture and the loop of material used in the embodiment shown in FIG. 9.

FIG. 9b shows an example of the relative size of the aperture and loop of material used in the embodiment shown in FIG. 9.

FIG. 9c shows an example of the relative size of the aperture and loop material used in the embodiment shown in FIG. 9.

FIG. 10 is a front view of a cell phone with a case or cover of the present invention.

FIG. 11 is a side cross-sectional view of a cell phone with the case or cover of the present invention the case including triangular shaped ribs to increase friction with the strip of material forming the loop.

FIG. 11a is a detailed view of a portion of the cross-sectional view of FIG. 11.

FIG. 12 is a front view of a case or cover of the present invention, the case including triangular shaped ribs to increase friction with the strip of material forming the loop.

FIG. 13 is a side cross-sectional view of a cell phone case of the present invention, the case including triangular shaped ribs to increase friction with the strip of material forming the loop.

FIG. 13 A is a detailed view of a section of FIG. 13, showing the detail of the triangular shaped ribs interacting with the strip of material.

FIG. 14 is a front view of a case or cover of the present invention.

FIG. 15 is a side cross-sectional view of the cell phone case shown in FIG. 14.

FIG. 15A is a detailed view of a section of the cell phone case shown in FIG. 15

FIG. 16 is a front view of the case or cover shown in FIG. 14, the case or cover having a cell phone placed within it.

FIG. 17 is a cross sectional side view of the cell phone and case shown in FIG. 16.

FIG. 17A is a detailed view of a section of FIG. 17.

FIG. 18 is a front view of a cell phone case of the present invention, the cell phone case including trapezoidal shaped surface features.

FIG. 19 is a side cross-sectional view of the cover shown in FIG. 18.

FIG. 19A is a detailed view of a portion of FIG. 19, showing the detail of the trapezoidal shaped surface features, and corresponding features on the end of the strip of material.

FIG. 20 is a front view of the case shown in FIG. 18, the case having a cell phone placed with in it.

FIG. 21 is a side cross-sectional view of FIG. 20, the case including trapezoidal shaped surface features.

FIG. 21A is a detailed view of a portion of FIG. 21, showing the interaction of the surface features on the cover and on the end of the strip of material.

FIG. 22 is a front view of a cell phone case or cover of the present invention, the case or cover including squared off surface features or notches.

FIG. 23 is a side cross-sectional view of the cell phone case of FIG. 22, having squared off surface features or notches.

FIG. 23A is detailed view of FIG. 23 showing the interaction between the surface features on the case and on the end of the strip of material.

FIG. 24 is a front view of the cell phone case shown in FIG. 22, the cell phone case having a cell phone placed with in it.

FIG. 25 is a cross-sectional view of FIG. 24, showing a cell phone placed within the case having squared off surface features.

FIG. 25A is a detailed view of the case shown in 25, showing the interaction of the surface features on the case with the surface features of the end of the strip of material.

FIG. 26 is a front view of the case of the present invention, also showing a strip of material incorporating indentations or areas of narrow width at the first and second ends of the strip of material.

FIG. 27 is a side cross-sectional view of the case shown in FIG. 26

FIG. 28 is a perspective view of a strip of material and spine or reinforcing backbone having protrusions.

FIG. 29 is a front view of a case or cover of the present invention utilizing a strip of material that includes a spine or reinforcing backbone.

FIG. 30 is a side cross-sectional view of the case shown in FIG. 29, where's the strip of material includes a spine or reinforcing backbone.

FIG. 30A is a detailed view of FIG. 30.

FIG. 31 is a front view of a cell phone case of the present invention, the cell phone case including a first and second post risings from the inside surface of the cell phone case.

FIG. 32 is a side cross-sectional view of the case or cover shown in FIG. 31.

FIG. 32A is a detailed view of a section of FIG. 32.

FIG. 33 is a front that you of the cell phone case of the present invention, the cell phone case including a first and second post risings from the inside surface of the cell phone case.

FIG. 34 is a side cross-sectional view of the cell phone case of FIG. 33.

FIG. 34A is a detailed view of a section of FIG. 34.

FIG. 35 is a front view of a cell phone case of the present invention, showing a cell phone located within the case.

FIG. 36 is a side cross-sectional view of a cell phone case of the present invention, the case including posts that rise from the inside surface of the case, the case having a cell phone with in it.

FIG. 36A is a detailed view of a region of FIG. 36.

DETAILED DESCRIPTION OF THE PREFERRED EMBODIMENT

With reference to the figures, FIG. 1 shows a finger loop 10 extending from a case 20. The case 20 is designed to be placed onto a cell phone 80, cell phone enclosure or housing so as to act as a cover for the cell phone, cell phone enclosure or housing. Such placement of the cell phone 80 in the case 20 is shown in FIGS. 10 through 11a. The case 20 includes an outer surface 21, and an inner surface 22 that faces opposite from the outer side 21. The case 20 includes a top perimeter edge 31, a bottom perimeter edge 33, a first perimeter side edge 32, and a second perimeter side edge 34.

The finger loop 10 is a strip of material 15 that extends away from the case 20 at a first location on the outer surface 21 of the case 20, and loops back to a second location on the outer surface 21 of the case 20. In the preferred embodiment shown in the figures, particularly FIGS. 1 and 2, the strip of material 15 interfaces with the case 20 by extending through first and second apertures 41 and 42 in the outer surface 21. As shown in FIGS. 11 through 13A and 18 through 24, the strip of material 15 can interact with structure on the inner surface 22 of the case 20 to increase the friction between the strip of material 15 and the inner surface 22 of the case 20 so as to prevent pullout of the strip of material 15 forming the loop 10.

The apertures 41 and 42 can be located anywhere on the case 20 outer surface 21. It is preferred that the first and second apertures 41 and 42 are located midway between the first and second perimeter side edges 32 and 34. For instance, most of the distance between the first and second apertures 41 and 42 may occur in the top half of the case 20, that is the portion of the case that is closer to the top perimeter edge 31 than to the bottom perimeter edge 32. However, the first and second apertures 41 and 42 may be positioned equidistant from the center point of the case. In other embodiments, most of the distance between the first and second apertures 41 and 42 may occur in the lower half of the case 20, that is the portion of the case that is closer to the bottom perimeter edge 33 and to the top perimeter edge 31.

Referencing FIG. 6, the strip of material 15 is preferably 10 centimeters in length from where it first extends from the case outer surface 21 at the first aperture 41 to where it returns to the case outer surface 21 at the second aperture 42. The length need not be 10 centimeters, but should be of a sufficient length to allow the user to place at least one finger through the finger loop 10. For example, a user may choose to have the 6-8 centimeters of the strip of material 15 extend from the outside surface 21 of the case 20. In other embodiments, the length may be longer to allow the user to place a plurality of fingers through the finger loop 10 when the user is holding the device. It is preferred that the distance between the first aperture 41 and the second aperture 42 is 3.5 centimeters, but it may be shorter or longer in other embodiments. For instance some embodiments may use a distance of 1.25 inches. The strip of material 15 can be of circular cross section, but it may have any shape that is convenient, such as rectangular, as shown in some of the figures herein.

In embodiments that do not include anchors 51 and 52, but rather include a first end 12 and second end 13, the length of the finger loop may be lengthened or shortened as the user sees fit. The length of the finger loop is adjusted by changing the length of the first end 12 or second end 13 that is captured between the inner side 22 of the case 20 and the back surface 81 of the cell phone 80.

It is also preferable that the finger loop 10 is constructed of a material that allows the finger loop 10 to stand off the outer surface 21 of the case 20. The strip of material 15 forming the finger loop 10 may be constructed of any suitable material. Examples include rubber, nylon, vinyl, other plastics, as well as natural materials such as cotton, wool, leather or other materials that are capable of being formed into a strip of material that flexes, and includes some elasticity. Additionally, it is preferred that the surface of the strip of material exhibits a high coefficient of friction with the inside surface 22 of the case or cover 20. As described herein, the surface or faces of the strip of material, may include a tackifier to further increase the adhesion of the strip of material 15 to the rear surface 81 of the cell phone 84 with the inside surface 22 of the case 20.

It is preferred that the finger loop 10 stand off the case 20 approximately at least 3 centimeters to allow the user to easily slip the user's finger or fingers into the finger loop 10 when the user goes to hold the device. Constructing the finger loop with a generally rectangular cross section, as shown in FIGS. 9b and 9c, as well as FIGS. 11 through 30A, allow the finger loop 10 to stand off the outer surface 21 of the case 20 better than a finger loop 10 of circular cross-section, such as shown in FIG. 4.

In additional embodiments, the strip of material 15 forming the finger loop 10 can include structure to provide stiffness properties in certain directions. For instance, it may be beneficial to construct the strip of material 15 to include a stiffer material, such as nylon, plastics, metals, or wire, in portions of the strip of material 15. Such an embodiment is shown in FIG. 3, as well as FIGS. 28 through 30A. With a spine 5 present, the finger loop 10 will resist bending at the point where the strip of material 15 enters the first and second apertures 41 and 42, in a lateral direction towards the first or second side perimeter edges 32 or 30 or of the case 20. As shown in FIG. 28, the strip of material has a generally rectangular cross-section having a first face 1 and an opposite face 2, and includes a first end 12 and a second end 13, and having a middle portion there between. In order to provide added stiffness a spine 5 or reinforcing backbone of a second material different from the material forming the strip of material 15 is incorporated within the strip of material 15. It is noted that the spine 5 is shown removed from the strip of material 15 in FIG. 28. While the spine 5 can be located anywhere within the strip of material 15, it is generally preferred that it is centrally located along the center axis of the strip of material 15. In typical applications, the strip of material 15 is made primarily of silicone, and the spine 5 is made of a stiffer material such as nylon, vinyl, metal, or other material having a flexibility that is less than that of the material used in the strip of material 15.

In other embodiments where multiple materials are utilized to create the finger loop 10, the strip of material 15 may include a first end 12 constructed of a first material, a middle portion constructed of a second material being stiffer than the first material, and a second end 13 constructed of a first material. With such a construction, the finger loop more readily acts as a stand allowing a user to set the cell phone at an angle to a supporting surface, with the finger loop acting as a stand to support a portion of the case off of the surface.

Similarly, the first end 12 and second end 13 can include a surface treatment of a tackifier or adhesive, or incorporate a tackifier in order to increase the coefficient of friction between the first end 12 or the second end 13 and the inner surface 22 of the case 20, or between the first end 12 or the second end 13 and the back surface 81 of the cell phone 80. It is preferable that the surface treatments or incorporated tackifier not be present on the middle portion of the strip of material 15, as the middle portion is exposed to the outside environment, whereas the first end 12 and the second end 13 are captured between the cell phone 80 and the case 20 where environmental elements such as dirt and dust are not present to contaminate the surface treated or incorporating a tackifier. Examples of suitable tackifiers are hydrogenated polyterpene resins and repositionable adhesives known in the art. As noted throughout, the middle portion of the strip of material 15, is approximately 10 cm in length. However, one skilled in the art will recognize that the length of the middle portion of the strip of material 15 can vary. Use of a tackifier maybe most important in embodiments that do not have any surface features on the inside surface 22 of the case 20, such as shown in FIGS. 14 through 17A. However a tackifier may be used in any of the embodiments shown.

Further, if a tackifier is utilized on the first or second end it is preferable that the tackifier only be present on one face of the strip of material, at the end, rather than on both faces at the end. If the tackifier were present on both faces at the end, the presence of the tackifier would present an increased coefficient of friction with both the back surface 81 of the cell phone 80, as well as the inside surface 22 of the cover 20. However the presence of the tackifier on both faces might make it difficult to insert the and into the respective aperture due to the increased coefficient of friction. However if the tackifier is only present on one face, that face can be rolled about the axial length of the end so that the face having the tackifier is on the interior, and the face without the tackifier is on the exterior of the curl. Thus the face without the tackifier is exposed to the case edges defining the aperture so that the increased coefficient of friction of the tackifier does not prevent or make difficult, the insertion of the end into the aperture.

As shown in FIGS. 3 through 6, the strip of material 15 forming the finger loop 10 may be constructed of approximately 3.2 mm diameter rubber, silicone, or other flexible material. One skilled in the art will recognize that other diameters, shapes, and materials may be used. As shown in other figures, including FIGS. 9B and 9C, the strip of material 15 may incorporate a generally rectangular cross-section. When the strip of material 15 has a generally rectangular cross-section, the strip of material will have a first face 1 and a second face 2. As shown in FIG. 3, the strip of material 15 may be constructed of more than one material. For instance the strip of material 15 may include a second material having properties different from the first material, such as a silicone rubber outer shell with a metal wire in the core, to provide added strength or stiffness to the finger loop, or as shown in FIG. 28, a silicone rubber outer covering, with a nylon spine 5.

As shown in figures, the finger loop 10 may be formed by attaching or otherwise securing the ends 12 and 13 of the strip of material 15 to the case 20, or alternatively securing a continuous loop of material to the case 20 as shown in FIG. 7. If the finger loop 10 is formed by securing the two ends 12 and 13 of the strip of material 15, the ends 12 and 13 may be secured in a number of ways. It is noted that each of the ends 12 and 13 may be secured in a way different from the other.

As shown in FIGS. 6 and 6A, the finger loop 10 is formed by securing the ends 12 and 13 into the strip material 15 to the case 20 itself. The ends 12 and 13 are molded into the case 20 between the outer surface 21, and the inner surface 22. This is typically done by co-molding the case 20 with the ends 12 and 13 molded between the layers of the case. As shown in FIG. 5b, a plastic sheet with an aperture 42 is provided. The strip of material end 13 extends through the aperture 42 and is placed on the surface 51 of the plastic sheet or first layer 31. The surface 51 of the plastic sheet or first layer 31 can include a channel, groove 53 or depression to accept the end 13. The surfaces forming the groove 53 are considered surfaces of the plastic sheet 31. A second plastic sheet or second layer 32 or other material can then be molded on top of the end 13 to secure the end between the surface of the plastic sheet and the second plastic sheet, or between the first and second layers of the case 20, thus securing the free end 13 and the strip of material 15 to the case 20. One could include indentations, protrusion, or other surface features on the end to help anchor the end in the groove 53 when the second layer 32 is molded on top of the end.

With reference to FIG. 6, the first and second ends 12 and 13 can be secured to the case 20 by providing anchors 51 and 52 on the first and second ends 12 and 13. The anchors are sized so that they do not fit through apertures 41 and 42. The anchors 51 and 52 may be separate pieces attached to the ends 12 and 13 after the free ends are inserted into the apertures 41 and 42. Alternatively, the anchors may be formed out of the strip of material 15, for example by compressing or otherwise deforming the ends 12 and 13 so they no longer fit through apertures 41 and 42.

FIG. 7 shows the finger loop 10 being formed by a continuous loop of material 16. The case 20 may be formed about the continuous loop of material 15, or alternatively, the continuous loop may start off as a strip of material that is fed into apertures 41 and 42 from the outer side of the case 20, and fusing the first and second ends 12 and 13 together to form a continuous loop.

In an alternate embodiment shown in FIG. 8, the continuous loop 16 can be formed separate from the case 20, and fastened to the outer side 21 of the case 20. It may be fastened by adhesive, welding, or mechanical fasteners such as screws or rivets. In such an alternate embodiment, the continuous loop 16 can include a portion that has one part of hook and loop fasteners 18a on the portions exterior surface. A portion of the case 20 can include the complementary part of the hook and loop fastener 18a. With such an arrangement, the finger loop 10 can be easily placed on the case 20, or removed from the case depending upon the user's desire.

FIGS. 9B and 9C show the finger loop 10 being formed by a strip of material 15 that is generally flat, and wider than the apertures 41 and 42. The strip of material 15 in such an embodiment has a generally rectangular cross-section. In the preferred embodiment, the apertures 41 and 42 are each 3.3 mm wide. The strip of material is 6 mm wide with generally parallel sides for most of its length. The width need not be 6 mm, and can be wider or narrower, and the thickness of the strip of material 15 can be thinner or thicker than 2 mm, with 2 mm preferred. The first and second ends 12 and 13 include a taper 16 and 17 at the ends so as to allow the ends 12 and 13 to be easily inserted in to apertures 41 and 42. One will recognize that the taper need not come to a point along the longitudinal of the strip of material as shown in FIG. 9B, but may instead be created by a single diagonal cut, so that the point of the taper occurs along a side edge of the strip of material 15, as exemplified in FIGS. 10, 12, and 14. In any event, the point and taper allow the ends of the strip of material 15 to more easily be inserted into the apertures 41 and 42. This arrangement allows the size of the finger loop 10 to be adjusted. One will recognize that ends 12 and 13 interact with the apertures 41 and 42 to create friction to secure loop of material to the case 20 as the ends 12 and 13 are wider that the apertures 41 and 42. Additionally, friction between the inside surface of the case 22 or with the back surface 61 of the phone 80 may also seek your the strip of material 15 to the cover 20. The rest of the strip of material 15 forming the finger loop can be of any width, including narrower than the ends 12 and 13.

Additionally, when the cell phone 80 is placed in the case 20, the back surface of the cell phone 81 acts to compress the ends 12 and 13, or to place pressure on the ends 12 and 13, between the back surface of the cell phone 81, and the inside surface 22 of the case 20. The compression or pressure works to secure, restrain, resist, or limit the movement of the ends 12 and 13, such that the ends 12 and 13 are held in place and do not pull out through the apertures 41 and 42.

As shown in FIGS. 11 through 13A and 18 through 25, the strip of material 15, may include regions that include surface features 90 to increase the friction between the strip of material 15, and the case 20, or to otherwise provide mechanical resistance to pull out. The surface features may take many different forms. For instance, the surface features can be knurling, half spheres or other arcuate shapes, squared off features, trapezoidal shapes, as shown in the figures. When squared off features are used, opposing vertical surfaces are presented to prevent horizontal movement along an axial line of the strip of material 15, thus preventing pullout of the first and second ends 12 and 13. The case 20 may include complementary features, or other texture to increase friction or mechanical advantage, to allow the surface features on the strip of material 15 to directly interact and engage the features on the case 20. Similarly, the inside surface 22 of the case 20 may include surface features with or without surface features being present on the first and second ends 12 and 13 of the strip of material 15. If the surface features are made of sufficiently small scale, the finger loop 10 may be adjusted in extremely small increments to suit the user. No matter what surface features are used to aid in the retention of the first and second ends 12 and 13, the surface features can be either on the case 20 itself, the strip of material 15, or on both.

The surface features can be on all or part of the strip of material 15. In the preferred embodiment, the surface features on the surface of the strip of material 15 are located so that when the strip of material 15 is placed into the apertures 41 and 42 so as to form a finger loop 10, the surface features on the strip of material 15 overlie and engage any surface features located on the inside surface of the case. Thus, it is preferable that the complementary surface features on the inside surface 22 of the case 20 are located near or adjacent the apertures 41 and 42. Similarly, the surface features on the strip of material 15 are located near the first and second ends 12 and 13, rather than in the middle portion of the strip of material 15 there between.

In the preferred embodiments, shown in FIGS. 10 through 28 it is preferable that the first and second ends 12 and 13 of the strip of material 15 are both oriented a downward direction when secured between the inside surface 22 of the case 20, and the back surface 81 of the portable electronic device or cell phone 80. When the strip of material 15 is constructed of a generally rectangular cross-section, such as shown in FIGS. 9 the and 9C, as well as FIGS. 10 through 30A, the strip of material 15 has a first face 1 and a second or opposite face 2 that are generally parallel to one another as they for form opposite surfaces or faces of the strip of material 15, similar to opposite sides of a coin. If both the first and second ends 12 and 13 are to be oriented in the same direction when secured between the inside surface 22 of the case 20 and the back surface 81 of the cell phone 80, one will recognize that such location, requires that the surface features on the strip of material 15 are on a first face at one of the first or second ends, and are located on a second face of the other end. Similarly, the complementary surface features on the inside surface 22 of the case 20 should be located towards the bottom perimeter 33 with respect to the respective aperture. The inside surface 22 of the case 20 may include complementary surface features in any area that may interact with the first and second ends 12 and 13 of the strip of material 15, no matter what orientation the strip of material takes when it is secured between the inside surface 22 of the case 20 and the back surface 81 cell phone 80

As shown in FIGS. 10 through 30A, the case 20 may include ribs 85 or other structure to displace the inside surface of the case from the body of the cell phone 80. Such displacement, allows room for the first and second ends 12 and 13 of the strip of material 15 to reside between the inside surface 22 of the cover 20 and the back surface 81 of the cell phone 80. In addition to providing displacement between the inside surface 22 of the case 20 and the back surface 81 of the cell phone 80, the ribs also strengthen the case 20 reduce flexing of the case 20 in the area around the aperture. It is preferred that the central channel 86 created by the ribs 85 about the apertures 41 and 42 be as small as possible. In the most preferred embodiments, the central channel is approximately the width of the first and second ends 12 and 13 of the strip of material 15.

In the most preferred embodiment, the ribs 85 are of a height above the inside surface 22 of the case 20 that is approximately equal to the thickness of the strip of material 15. If the strip of material 15 is not of uniform thickness, it is preferred that the ribs are of a height above the inside surface of the case that is approximately equal to the thickness of the strip of material 15 first and second ends 12 and 13.

In other embodiments, rather than using ribs, the inside surface of the case 20 includes a channel adjacent the apertures 41 and 42, the channel being of sufficient depth to accommodate the first and second ends 12 and 13 of the strip of material 15. As with other embodiments, the channel can include cross ribs or surface features 90 that are of a height less than the height of the ribs 85 or the depth of the channel such that the cross ribs or other surface features 90 compress the first and second ends 12 and 13 of the strip of material 15 when the first and second ends 12 and 13 of the strip of material 15 are captured between the inside surface of the case 22 and the back surface 81 of the cell phone 80 or other electronic device. Such interaction increases the friction and holding capacity and resists pullout of the first and second ends 12 and 13 of the strip of material 15.

As shown in FIGS. 26 and 27, the width of the first and second ends 12 and 13 can be varied along their axial length to create indentations 4. The indentations create areas of narrow width are approximately the width of the diameter of the first and second apertures 41 and 42. In other embodiments, the indentations 4 are sized to create an area of narrowed width that is slightly larger than the aperture diameter, so as to create a small amount of friction between the end of the strip of material 15, and the sidewalls of the respective aperture. Thus, the areas of narrow width pass easily through the aperture, but the passage of the end is stopped or resisted when the aperture encounters the areas of wider width.

In an alternate embodiment, shown in FIGS. 33 through 36A, the case 20 may include structures to provide a more positive engagement with the strip of material 15 first and second ends 12 and 13. Specifically, the first and second ends 12 and 13 include a plurality of apertures 98 that pass through from the first face 1 to the second face 2. The apertures are positioned along and axial longitudinal line. One skilled in the art will recognize that the apertures 98 can be positioned in other locations on the ends 12 and 13, and may occur along the entire length of the strip of material 15.

The case 20 includes first post 91 and second post 92 that rise above the inside surface 22, and are located adjacent the respective first or second apertures 41 and 42. It is preferred, 50 posts 91 and 92 are located within the central channel 86. The first and second posts 91 and 92 are of a height above the inside surface 22 that is roughly equal to the height of the ribs 85 above the inside surface 22 of the case or cover 20. One skilled in the art will recognize that the height of the first and second posts 91 and 92 can be less than the height of the ribs 85. However, as the height is lessened, there is an increased chance that the inside surface 22 of the cover 20 can be displaced a way from the back surface 81 on of the cell phone 80 and allow sufficient space between the top end of the first or second posts 91 and 92 and the back of the cell phone 81 and allow the first or second ends 12 and 13 of the strip of material 15 to pass by and pull through the respective aperture 41 or 42.

The first and second post 91 and 92 may be of any cross sectional shape. It is preferred that the posts are arcuate or circular so as not to create any stress risers.

As shown in FIGS. 33 through 34A, when the strip of material 15 having the apertures 98 is placed on the case 22 form a finger loop 10, one of the apertures 98 of the first and 12 is placed over the second post 92, and one of the apertures 98 of the second and 13 is placed over the first post 91 to thereby secure the first and second ends 12 and 13 and prevent them from being pulled out of apertures 41 and 42 in the case 20. As shown in cross-sectional FIGS. 34 and 34A, the first and second ends 12 and 13 are captured between the inside surface 22 of the case 20 and the back surface 81 of the cell phone 80 such that the first or second ends 12 and 13 will not pull through the apertures 41 or 42.

Although the preferred embodiment has been described as being applied to a case for a portable electronic device housing or enclosure, the invention can also be applied to the housing or enclosure itself.

The foregoing disclosure of specific embodiments is intended to be illustrative of the broad concepts comprehended by the invention. The embodiments given herein are examples, and are not meant to limit the scope of the invention.

We claim:

1. A cover for a portable electronic device, the cover including an inside surface and an outside surface, the cover including first and second circular apertures through the inside surface to the outside surface, a flat strip of material having a middle portion and a first end and a second end, the first end positioned in the first aperture and the second end positioned in the second aperture so that the middle portion extends from the apertures and is positioned above the outside surface of the cover, the first end including a first end portion extending away from the inside surface of the cover and secured by contact with a back surface of a portable electronic device and the inside surface of the cover when the cover is placed on the portable electronic device.

2. The cover of claim 1, wherein the inside surface of the cover includes surface features to increase friction with the flat strip of material.

3. The cover of claim 1, the cover further includes a first perimeter edge, a second perimeter edge, and a center point positioned midway between the first and second perimeter edges, wherein most of a distance between the first and second apertures occurs in an area between the first perimeter edge and the center point of the case.

4. The cover of claim 1, where in a length of the middle portion of the flat strip of material is longer than a distance between the first and second apertures.

5. The cover of claim 4 wherein the length of the middle portion of the flat strip of material is between 6 and 8 centimeters.

6. The cover of claim 4, wherein the distance between the first and second apertures is 3.5 centimeters.

7. The cover of claim 1, wherein the strip of material includes a face that contacts the portable electronic device, the face including a tackifier.

8. The cover of claim 1, wherein the flat strip of material has a rectangular cross section.

9. The cover of claim 2, wherein the surface features are perpendicular to an axial line of the flat strip of material.

10. The cover of claim 2, wherein the first and second ends of the flat strip of material include surface features that are complementary to the surface features on the inside surface of the cover.

11. The cover of claim 1, wherein the inside surface of the cover includes ribs to displace the inside surface of the cover from the back surface of the portable electronic device.

12. The cover of claim 11 wherein a height of the ribs above the inside surface of the cover is approximately equal to a thickness of the flat strip of material.

13. A cover for a portable electronic device, the cover including an inside surface and an outside surface, the cover including first and second circular apertures through the inside surface to the outside surface, a strip of material of generally rectangular cross section with a first face and a second face, the strip of material positioned in the first and second apertures and having a middle portion that extends above the outside surface of the cover and a first end and a second end, the first end positioned with a face in contact with the inside surface of the cover and the second end positioned with a face in contact with the inside surface of the cover.

14. The cover of claim 13, wherein the first face of the first end of the strip of material and the second face of the second end of the strip of material are in contact with the inside surface of the case.

15. The cover of claim 14, wherein the strip of material is wider than a diameter of the first and second apertures.

16. The cover of claim 14 wherein the first face of the first end of the strip of material has surface features and the second face of the second end of the strip of material has surface features.

17. The cover of claim 15 wherein the surface features on the first and second ends of the strip of material are complementary to surface features on the inside surface of the cover.

\* \* \* \* \*

UNITED STATES PATENT AND TRADEMARK OFFICE
CERTIFICATE OF CORRECTION

Page 1 of 1

PATENT NO. : 8,950,638 B2
APPLICATION NO. : 14/037287
DATED : February 10, 2015
INVENTOR(S) : Wangercyn, Jr. et al.

It is certified that error appears in the above-identified patent and that said Letters Patent is hereby corrected as shown below:

On the Title Page:

Assignee should read:

-- (73) Assignee:   Loopy Cases LLC, Schererville, IN (US) --.

Signed and Sealed this
Thirtieth Day of June, 2015

Michelle K. Lee
*Director of the United States Patent and Trademark Office*